United States Patent

Beach

[15] 3,636,592
[45] Jan. 25, 1972

[54] TOOTHED SEAL

[72] Inventor: John R. Beach, Elmhurst, Ill.

[73] Assignee: Signode Corporation, Chicago, Ill.

[22] Filed: Aug. 3, 1970

[21] Appl. No.: 60,267

[52] U.S. Cl. ..........................................24/23 W
[51] Int. Cl. ......................................B65d 63/06
[58] Field of Search..............24/20 W, 30.5 W, 16 R, 16 PB, 24/23 R, 23 W

[56] References Cited

UNITED STATES PATENTS

| | | | |
|---|---|---|---|
| 732,270 | 6/1903 | Bowman | 24/23 W |
| 2,830,344 | 4/1958 | Crosby | 24/23 W |
| 3,197,831 | 8/1965 | Martin et al. | 24/16 R |
| 3,261,063 | 7/1966 | Rutty | 24/23 W |

Primary Examiner—Donald A. Griffin
Attorney—Dressler, Goldsmith, Clement & Gordon

[57] ABSTRACT

A seal for securing together overlapping portions of a plastic strapping ligature, with the seal including a central portion having a plurality of teeth thereon which bite into one strap portion and a pair of reversely bent legs each having a plurality of teeth thereon which bite into the other strap portion. The teeth are arranged in a plurality of rows or columns in the central portion and each of the legs of the seal, and the teeth are formed by displacing material outwardly from the strap engaging surface of the seal, so that the outer surface of the seal remains generally smooth and nonperforated. The teeth all have a similar configuration including an upright strap engaging surface, with a plurality of the teeth on the central portion and on each leg having their upright surfaces facing in opposite directions.

8 Claims, 12 Drawing Figures

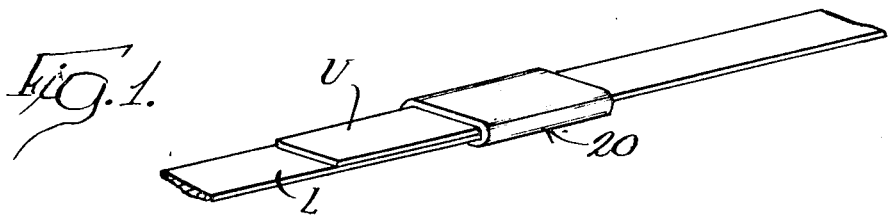
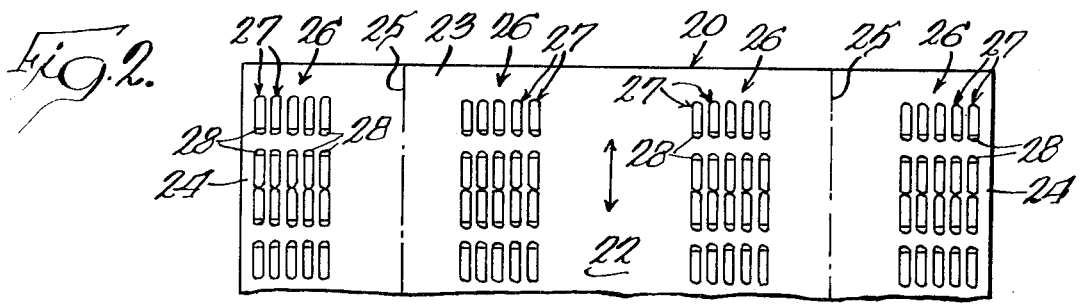
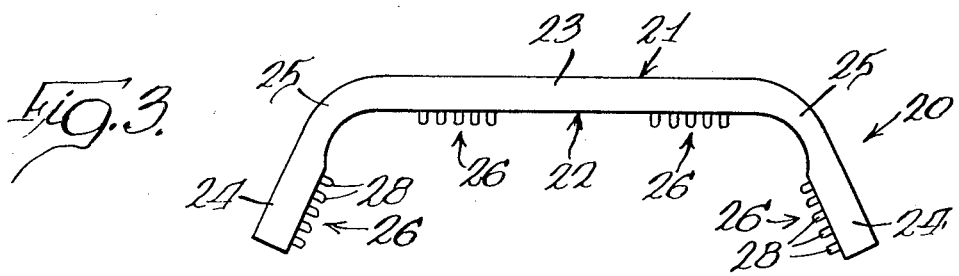
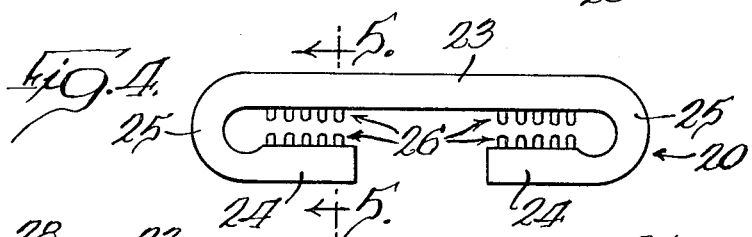
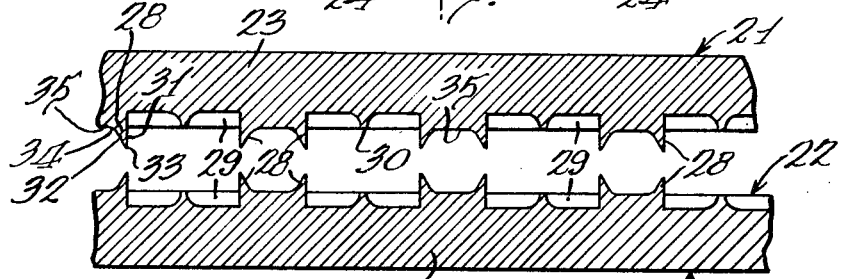
Inventor:
John R. Beach
By Dressler, Goldsmith, Clement & Gordon
Att'ys

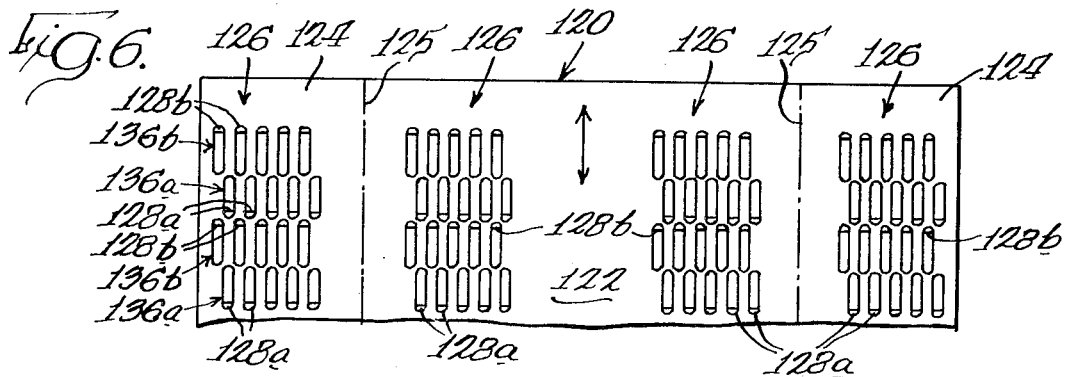
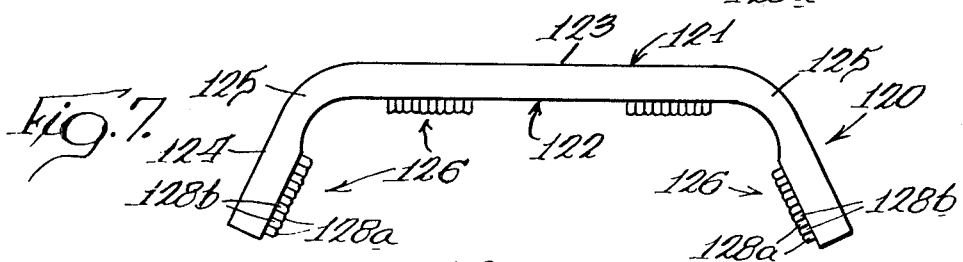
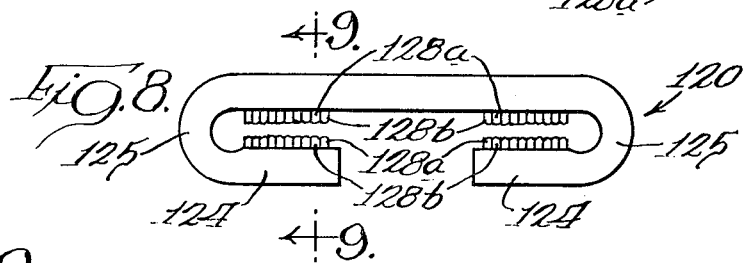
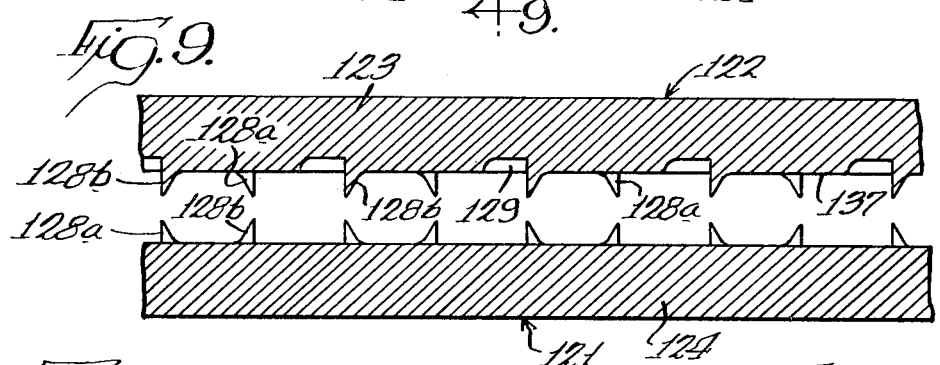
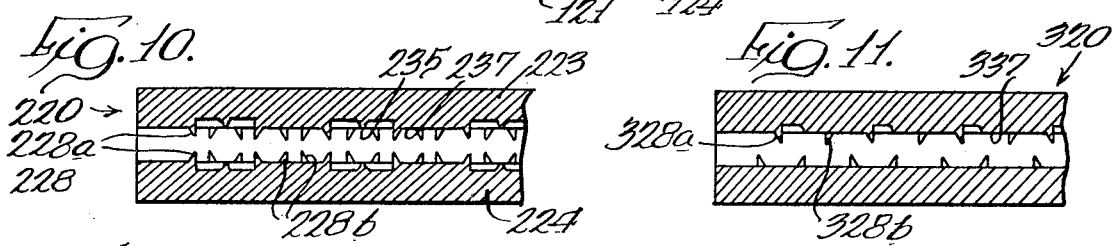
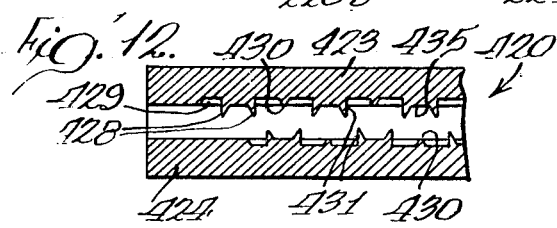

TOOTHED SEAL

BACKGROUND OF THE INVENTION

In the recent past, the use of longitudinally oriented thermoplastic materials has gained widespread commercial acceptance in the strapping industry. While having desirable properties, such materials have other properties which makes it difficult to form a satisfactory closure in a tensioned strapping ligature. For example, such materials are usually quite slippery, and there is a great tendency for the strapping material to move relative to the seal when the loop is placed under tension. Furthermore, because of the longitudinal orientation of the material, if it is desired to provide projections on a seal that bite into the strap to overcome the slipperiness problem mentioned above, the tooth configuration must be closely controlled to avoid too much transverse penetration of the strap which could result in the shredding of the strap when it is placed under tension.

Many attempts have been made to provide seals which overcome the problems mentioned above, and several embodiments of such seals are disclosed in Martin et al. U.S. Pat. No. 3,197,831 and Young U.S. Pat. No. 3,237,256, both assigned to the assignee of the present application. While the seals disclosed in the above-mentioned patents have functioned generally satisfactorily for their intended purpose, such seals have had certain inherent disadvantages. For example, in the above-mentioned Young patent, a seal is disclosed wherein a layer of hard particulate material is uniformly distributed on the strap engaging surfaces of the seal to provide a plurality of individual members which engage the adjacent strap portion to increase the friction between the seal and the strap portion. The main problem in connection with seals of the type disclosed in the Young patent is that in use some of the particles become loosened from the seal, and often find their way into the various mechanisms of the tensioning and sealing tools accelerating wear thereof. Furthermore, such seals do not present a desirable, clean appearance.

Of the many different types of seals disclosed and claimed in the above-mentioned Martin et al. patent, some are rather expensive and impractical to fabricate, and require that the seals be properly positioned relative to the seal closing tool to insure that the seal performs its desired function. With particular reference to FIGS. 21–30 of the Martin et al. patent, several forms of seals are illustrated therein having toothlike projections on the strap engaging surfaces that are intended to bite into adjacent strap portions and prevent separation thereof. In the embodiments illustrated in these views, the projections on the strap engaging surfaces of the seal are formed by striking the outer surface of the seal either before (FIGS. 21–29) or after (FIG. 30) the seal has been compressed around the overlapping strap portions. By striking the outer surface of the seal, either before or after the seal is secured around overlapping strap portions, it is not possible to provide a sharp or pointed projection on the strap engaging surface of the seal; and instead, the projection has a rounded end portion. These rounded projections do not develop sufficient bite to insure that the strap end portions will not pull out once the strapping ligature is secured around an article. In addition, in the embodiments of FIGS. 21–26 all of the projections on the central portion of the seal face in one direction while the projections on the legs of the seal face in an opposite direction. This requires that the seal be properly positioned relative to the overlapping strap portions so that the projections will face in the direction opposite to the tensile force in the adjacent strap portion.

BRIEF SUMMARY OF THE INVENTION

The present invention obviates the above-noted problems by providing projections on the strap contacting surface of the seal that are permanently associated with the seal. The projections are in the form of a plurality of teeth that project outwardly from the strap engaging surface of the seal with each tooth being provided at one end of a recess in the strap engaging surface and formed of the material that formerly occupied the recess. By forming the seal teeth of material formerly present on the strap engaging surface, it is possible to give the teeth a desired configuration including a pointed end to enhance the ability of the teeth to bite into the adjacent strap material. In a desired arrangement, the teeth each have a buttress shaped configuration in side elevation, with the upright surfaces of adjacent teeth facing in opposite directions so that the teeth will function to effectively hold overlapping strap portions regardless of the direction in which the seal is applied to the strap.

By forming the strap engaging teeth from material at the strap engaging surface of the seal, it is possible to closely control the shape and configuration of the teeth. Furthermore, it is possible to provide a large number of closely spaced teeth which will function to positively hold the overlapping strap portions without shredding the strap and destroying its desirable properties.

BRIEF DESCRIPTION OF THE DRAWINGS

FIG. 1 is a perspective view of a first embodiment of the seal of the present invention shown in closed relationship about a pair of overlapping strap portions;

FIG. 2 is an enlarged fragmentary plan view of the strap engaging surface of the seal;

FIG. 3 is an end view of the seal illustrating the seal in partially bent or formed condition suitable for stacking and nesting with other like seals;

FIG. 4 is an end view of the seal in FIG. 3 in fully closed position;

FIG. 5 is an enlarged fragmentary view taken generally along line 5—5 of FIG. 4;

FIGS. 6–9 are views corresponding to FIGS. 2–5, respectively, and illustrating a second embodiment of the seal;

FIGS. 10, 11 and 12 are sectional views similar to FIGS. 5 and 9, but on a reduced scale, and illustrating, respectively, third, fourth and fifth embodiments of the invention.

DETAILED DESCRIPTION

A first seal embodiment is illustrated in its entirety at 20 in FIGS. 1–5 of the drawings, and seal 20 is used to create a closure in a strap loop that includes overlapping strap portions U and L. The seals of the present invention have particular utility with longitudinally oriented thermoplastic strapping materials that are in common use today, such as nylon and polypropylene. As will be evident from the ensuing description, the seals of the present invention include projections on the strap engaging surface thereof, and the seals are formed of a material, such as steel, that is substantially harder than the strap portions U and L, so that the projections on the seals can bite into and firmly hold the overlapping strap portions.

Seal 20 is formed from a generally rectangular blank that has an outer surface 21 and a strap engaging surface 22. A plurality of strap engaging projections, to be hereafter described in detail, are formed on strap engaging surface 22 by striking the strap engaging surface 22 with a tooth forming member (not shown) when the seal blank is in the flat condition shown in FIG. 2. By striking the strap engaging surface 22, the outer surface 21 remains substantially flat and imperforate.

Seal 20 includes a generally rectangularly shaped central portion 23 that is flanked by legs or flanges 24 at opposite sides thereof. Legs 24 are connected to central portion 23 by parallel fold lines 25, and either simultaneously with, or following, the formation of the projections on the strap engaging surface, the legs 24 are partially bent toward one another to the position of FIG. 3. With the seal 20 in the position of FIG. 3, it can be nested together with a plurality of other like seals to provide a stack of seals which can be inserted as a unit into a seal dispensing magazine of known construction that is usable with a conventional sealing tool for completing the bending of legs 24 to the position of FIG. 4. In the FIG. 4 position, the legs 24 have been bent into a position of parallelism with central portion 23, and the projections on legs 24 bite into and retain strap portion L, while the projections on central portion 23 bite into and retain the strap portion U.

In the embodiment illustrated in FIGS. 1–5, four identical groups 26 of projections are provided on the strap engaging surface 22, one group 26 being provided on each leg 24, and two groups 26 being provided on central portion 23. Each group 26 includes a plurality of longitudinally extending parallel rows 27 of projections, each row having a plurality of longitudinally spaced individual projections 28 therein. In the embodiment of FIGS. 1–5, five rows or columns 27 are provided in each group 26, and each row 27 includes 16 projections 28, so that there are 80 projections in each group 26 and a total of 320 projections in each seal 20.

The shape of projections 28 will be best understood from a consideration of FIG. 5. As is mentioned above, projections 28 are formed by displacing material outwardly from the strap engaging surface 22 of the seal 20. In the projection forming step, a tool strikes surface 22 and displaces material therefrom to form a recess 29, with the material formerly occupying recess 29 being displaced outwardly of surface 22 to form the projection 28. Recesses 29 are positioned closely adjacent to one another, as is evident from FIG. 2, but the recesses are spaced by a land area 30 on strap engaging surface 22. By having the recesses 29 spaced from one another the amount of material that comprises each projection 28 is accurately controlled, so that the configuration of the projections 28 28 will be consistent.

Projections 28 have what might be called a buttresslike configuration in side elevation and each projection includes an upright surface 31 that is adapted to make broad faced engagement with the strap when the seal 20 is folded into the closed position of FIG. 4. Projections 28 each further include an inclined surface 32 that converges toward upright surface 31 to provide a sharpened point 33 at the end of the projection for biting into the adjacent strap portion. The lower portion 34 of each projection 28 makes a rounded merger with a land area 35 at the level of surface 22 to provide a broad base at the bottom of projection 28 which adds strength thereto.

As is evident from FIGS. 2 and 5, land areas 30 are positioned between adjacent recesses 29 in each row 27, so that the upright surfaces 31 on the projections 28 at opposite sides of each land area 30 face in opposite directions. In the exemplary embodiment mentioned above including 320 teeth, 160 of such teeth face is opposite directions. This provides an arrangement wherein the stack of seal blanks can be loaded in a dispensing mechanism without regard to the direction in which the stack is facing, since the seal 20 will provide an effective strap binding mechanism regardless of the direction in which the seal 20 faces. In a seal such as described above, the individual teeth 28 typically have a width of 0.012 inch, and project outwardly of the strap engaging surface 22 by 0.014 inch. Such seals have functioned with exceptional results with strapping having a thickness of 0.015 inch and 0.020 inch. In a similar seal 70 teeth are provided on each leg 24 and 80 teeth are provided in each group 26 on central portion 23 making a total of 300 teeth, 150 teeth facing each end of the seal. In this latter seal, the teeth again have a typical width of 0.012 inch and project out from surface 22 by 0.018 inch. These seals have given exceptional results with strapping 0.025 and 0.030 inch thick. As is evident from FIG. 4, when the seal 20 is completely closed around the overlapping strap portions U and L, the rows 27 on legs 24 are positioned in alignment with the rows 27 on central portion 23, although this is not absolutely necessary for proper functioning of the seal 20.

The seal embodiment illustrated in FIGS. 6–9 is similar to the previously described embodiment, so that similar reference numerals have been used to designate corresponding elements, with the reference numerals having been increased by the sum 100 for the embodiment of FIGS. 6–9. As with the previously described embodiment, seal 120 includes a plurality of groups 126 of projections on the strap engaging surface 122, with one group of projections 126 being provided on each leg 124 of the seal, and with two groups 126 of projections being provided on the central portion 123 of the seal. The seal 120 differs from the seal 20 essentially in that instead of having the projections arranged in longitudinally extending rows, the projections are arranged in transversely offset sets 136a and 136b, with the projections in sets 136a being longitudinally aligned with one another, and with the projections in sets 136b being longitudinally aligned with one another. With this arrangement, the projections 128a in each set 136a face in the same direction, while the projections 128b in each set 136b face in the same direction and opposite to the direction of projections 128a. It will be noted from FIG. 9, that with this arrangement, the recesses 129 are spaced a substantial distance from one another, to provide a relatively large land area 137 between recess 129 and an adjacent projection. It will also be noted from FIG. 9 that when the seal 120 is in the fully closed position, oppositely facing teeth 128a and 128b are transversely aligned, yet offset, with one another.

The embodiment of FIG. 10 is similar to the previously described embodiments, so that similar reference numerals in the 200 series have been used to designate those elements which correspond with the elements in the previously described embodiments. When the seal 220 is in the fully closed position as shown in FIG. 10, projections 228a on central portion 223 are aligned with projections 228a on legs 224. The projections 228a are arranged in a longitudinally aligned row, as in the embodiment of FIGS. 1–5, and the teeth 228a in alternating rows are spaced by relatively long land areas 237. The teeth 228b in the rows adjacent rows 228a are positioned in alignment with land areas 237 when the seal is in the fully closed position, so that a pair of oppositely facing teeth 228b are provided between each pair of oppositely facing teeth 228a, although they are transversely offset relative thereto.

The seal of FIG. 11 is similar to the previously described embodiments, so that reference numerals in the 300 series are used to designate those elements which correspond with the previously described embodiments. The embodiment of FIG. 11 resembles the embodiment of FIGS. 6–9 to the extent that the groups of projections on the legs and the central portion of the seal are arranged in transversely staggered sets, with the teeth 328a facing in one direction and with the teeth 328b facing in an opposite direction. Relatively large land areas 337 are provided between each of the teeth 328a and 328b.

The seal of FIG. 12 is also similar to the previously described embodiments, and reference numerals in the 400 series are used to designate elements which correspond to those in the previously described embodiments. As with the embodiment of FIGS. 1–5, two groups of projections 428 are provided on the central portion 423 of the seal, while one group of projections 428 are provided on each leg 424. Also, each group of projections 428 includes a plurality of longitudinally extending parallel rows, with the rows on the central portion 423 being aligned with the rows on legs 424 when the legs are folded into parallelism with the central portion. The embodiment of FIG. 12 differs essentially from the embodiment of FIGS. 1–5 in that the teeth 428 and recesses 429 in the flanges of the seal are offset longitudinally relative to the teeth 428 and recesses 429 in the central portion of the seal. Thus, when the seal 420 is secured around the overlapping portions of a strapping ligature the land areas 435 between teeth 428 are spaced from the land areas 430 between recesses 429, while the teeth 428 are positioned adjacent the end of the vertically aligned recess 429.

What is claimed is:

1. A seal for joining and securing a pair of overlapping plastic strap portions which comprises: a body of sheet material having a hardness which exceeds the hardness of the plastic strap to be secured thereby, said body having a strap engaging surface on one side and a generally smooth nonperforated outer surface on the other side, said body including a generally rectangularly shaped central portion and a pair of generally rectangularly shaped legs each interconnected to the central portion by a longitudinally extending bend, the strap contacting surfaces of said central portion and said legs having a plurality of teeth thereon, said teeth rising outwardly from a recess in the strap engaging surface of the seal and each tooth being formed of material displaced outwardly from the strap contacting surfaces and formerly occupying its respective recess, said teeth having a depth and hardness effective to penetrate and securely hold the plastic strap portions when the seal is closed thereabout and pressed into firm engagement therewith, and each of said teeth having a buttress profile shape which defines a generally upright surface for providing substantially broad faced engagement with a section of a strap portion.

2. A seal as set forth in claim 1 wherein each tooth is provided at the end of a recess.

3. A seal as set forth in claim 1 wherein said teeth are arranged in columns that extend longitudinally of the seal.

4. A seal as set forth in claim 5 wherein a plurality of columns are provided on said central portions and on each of said legs.

5. A seal for joining and securing a pair of overlapping plastic strap portions which comprises: a body of sheet material having a hardness which exceeds the hardness of the plastic strap to be secured thereby, said body having a strap engaging surface on one side and a generally smooth nonperforated outer surface on the other side, said body including a generally rectangularly shaped central portion and a pair of generally rectangularly shaped legs each interconnected to the central portion by a longitudinally extending bend, the strap contacting surfaces of said central portion and said legs having a plurality of teeth thereon, said teeth rising outwardly from a recess in the strap engaging surface of the seal and each tooth being formed of material displaced outwardly from the strap contacting surfaces and formerly occupying its respective recess, said teeth having a depth and hardness effective to penetrate and securely hold the plastic strap portions when the seal is closed thereabout and pressed into firm engagement therewith, each of said teeth having a buttress profile shape which defines a generally upright surface for providing substantially broad faced engagement with a section of a strap portion, and a plurality of the teeth on each leg and on the central portion having the upright surfaces thereof facing in opposite directions.

6. A seal as set forth in claim 5 wherein each tooth is provided at the end of a recess.

7. A seal as set forth in claim 5 wherein said teeth are arranged in columns that extend longitudinally of the seal.

8. A seal as set forth in claim 7 wherein a plurality of columns are provided on said central portion and on each of said legs.

* * * * *

UNITED STATES PATENT OFFICE
CERTIFICATE OF CORRECTION

Patent No. 3,636,592      Dated January 25, 1972

Inventor(s) JOHN R. BEACH

It is certified that error appears in the above-identified patent and that said Letters Patent are hereby corrected as shown below:

Column 3, line 28, delete the second "28".

Column 5, line 17, "claim 5" should read -- claim 3 --.

Column 5, line 18, "portions" should read -- portion --.

Signed and sealed this 15th day of August 1972.

(SEAL)
Attest:

EDWARD M. FLETCHER, JR.
Attesting Officer

ROBERT GOTTSCHALK
Commissioner of Patents